3,450,654
RESINOUS COMPOSITIONS AND METHOD OF
MAKING SAME
Thomas Ramos, New York, N.Y.
(61—88 Dry Harbor Road, Middle Village, N.Y. 11379)
No Drawing. Continuation-in-part of application Ser. No.
281,368, May 17, 1963. This application Oct. 9, 1964,
Ser. No. 402,975
Int. Cl. C08g 30/10, 30/08, 30/14
U.S. Cl. 260—18                                     6 Claims

ABSTRACT OF THE DISCLOSURE

Prepolymers obtained by the reaction of a diglycidyl ether of a polyhydric alcohol with a chlorine hindered diamine such as, 4,4'-methylene-bis (2 chloraniline) or a sulfonated diamine or a hydroquinone and its derivatives are cured with stannous octoate as a curing agent, without added heat and in the temperature range of about 50° F. to 100° F. which range, includes room temperature. The rate of curing with stannous octoate is determined by controlling the proportion of stannous octoate added to the prepolymer.

---

The invention described herein may be manufactured and used by or for the Government of the United States of America for governmental purposes without the payment of any royalties thereon or therefor.

This invention relates to the preparation of resinous prepolymers that self-cure within a reasonable time without added heat, or at room temperature, by the addition of stannous octoate as a curing agent and to such cured prepolymers adapted to different end uses.

In my copending application, Ser. No. 281,368, filed May 17, 1963, now abandoned, I disclose the preparation of a number of prepolymers from a digylcidyl ether of a polyhydric alcohol reacted with various diamines and cured by any of various curing agents.

In accordance with my discovery, I first prepare a resinous prepolymer by mixing slowly together, while stirring a digylcidyl ether of a polyhydric alcohol, including glycols and polyglycols, which alcohols contain at least two hydroxyl groups, at least one of which is a primary hydroxyl group, with 4,4'-methylene-bis (2-chloroaniline), and subjecting this mixture, while stirring, to a temperature between about 212° F. and 225° F. and not over 250° F. until a homogeneous liquid is obtained. This is then cooled immediately to about room temperature, i.e., between about 50° F. and 100° F.

Such diglycidyl ethers of polyhydric alcohols are disclosed in U.S. Patent 3,033,803 issued on May 8, 1962. Some examples of polyhydric alcohols that may be used in preparing diglycidyl ethers of polyhydric alcohols are those having a hydrocarbon chain between the hydroxyl groups. These polyhydric alcohols are advantages in imparting an aliphatic hydrocarbon element into the resulting glycide ether. Among such alcohols are ethylene glycol, butanediol, pentanediol, diethylene glycol, triethylene glycol, hexantriol, glycerol, and various polyethylene glycols and polypropylene glycols, etc. Of these polyhydric alcohols used for the preparation of diglycidyl ethers, I have found that the following are particularly useful and satisfactory: ethylene glycol; 1,4-butanediol; 1-3-butanediol; 2,3-butanediol; 2-butanediol-1,4; 1,5-pentanediol; diethylene glycol; triethylene glycol, and tripropylene glycol.

The preferred proportions of the components for the prepolymer mixture are 100 parts by weight of the diglycidyl ether with about 27 to 85 parts by weight of the other component.

These resinous compositions, by curing, are useful as encapsulant, caulking, adhesive, coating, casting potting, embedding and vibration damping materials. When this prepolymer is to be cured for use, a curing agent, stannous octoate, is added in the proportion of about 4 to 85 parts by weight of the stannous octoate for each 100 parts by weight of the prepolymer. This prepolymer with added stannous octoate will self-cure without added heat, such as at about room temperature, within a reasonable time depending upon the amount of the stannous octoate which is added. The larger the proportion of stannous octoate which is added, the faster will be the rate of curing. If materially more than about 85 parts by weight of the stannous octoate for each 100 parts by weight of the prepolymer are added, the curing becomes so rapid that it is difficult to apply it to various uses.

TYPICAL EXAMPLE 1

Constituents:                                    Parts by weight
   Prepolymer obtained by reaction of 1,4-butane-
    diol diglycidyl ether and 4,4'-methylene-bis
    2-chloro-aniline) _____ 100
   Stannous octoate _____ 4–85

Such prepolymer used may, for convenience, be called "Glyamine C" resin.

TYPICAL EXAMPLE 2

Constituents:                                    Parts by weight
   The prepolymer as, for Example 1 above ____ 100
   Stannous octoate _____ 4

TYPICAL EXAMPLE 3

Constituents:                                    Parts by weight
   The prepolymer as for Example 1 above ____ 100
   Stannous octoate _____ 10

TYPICAL EXAMPLE 4

Constituents:                                    Parts by weight
   The prepolymer as for Example 1 _____ 100
   Stannous octoate _____ 20–85

In adapting this basic resin to various uses, additions of components may be made which depend upon the particular end uses. The resin, just before it is cured, may be used as an encapsulant, potting adhesive, caulking, coating or embedding compound, or as a vibration damping material. For many of these uses, property modifying agents may advantageously be added. For example, if the resin is to be used as a coating, it may have added to it agents that adapt it for easier application, such as fillers, fire retardant materials, anti-sag and thixotropic agents, diluents, plasticizers, and any of the other additives commonly used as additives in paints and coating materials. Some examples of the new resinous compositions with additives are given below.

TYPICAL EXAMPLE 5

Constituents:                                    Parts by weight
   The prepolymer as in Example 1 _____ 100
   Xylene _____ 12
   Dibutyl phthalate _____ 10
   Chlorinated paraffin ("Halowax 4004") _____ 10
   Antimony trioxide _____ 1
   Cab-O-Sil _____ 1

| Constituents: | Parts by weight |
|---|---|
| Stannous octoate | 4 |
| Silica sand (80 mesh) | 100 |

TYPICAL EXAMPLE 6

| Parts by weight | Constituent | Function |
|---|---|---|
| 100 | The prepolymer of Example 1. | Binder. |
| 12-50 | Toluene | Solvent, diluent or thinner. |
| 10-20 | Mineral oil | Slip additive, flow improver or internal lubricant. |
| 10-50 | Chlorinated paraffin | Flame retardant and plasticizer. |
| 1-20 | Antimony trioxide | Flame retardant. |
| 1-20 | "Cab-O-Sil" | Gellant, anti-sag agent or thixotropic agent. |
| 4-15 | Stannous octoate | Curing agent. |
| 50-550 | Silica sand | Filler. |

The chlorinated paraffin used was marketed under the trademark "Halowax 4004" and is described in technical bulletin "Halowax 4004" published by Koppers Co., Inc. of Pittsburgh, Pa. on July 15, 1959. "Halowax 4004" is a chemically inert chlorinated hydrocarbon of low viscosity, light yellow, liquid, possessing good heat stability, and containing 39–41 percent by weight of chlorine. It does not condense or polymerize, is non-flammable and is not affected by acids, alkalis and oxidizing agents at room temperature.

TYPICAL EXAMPLE 7

| Constituents: | Parts by weight |
|---|---|
| The prepolymer of Example 1 | 100 |
| Butyl Cellosolve | 50 |
| Ethylene glycol | 20 |
| "Halowax 4004" | 50 |
| Antimony trioxide | 20 |
| "Bentone 38" | 20 |
| Stannous octoate | 15 |
| Aluminum oxide 80 TP | 200 |

The "Bentone" component is marketed under that name by National Lead Co., 111 Broadway, New York, N.Y. and is described in technical bulletin "Bentone Gellants, a Handbook of Practical Application" published in 1960 by National Lead Co.

TYPICAL EXAMPLE 8

| Constituents: | Parts by weight |
|---|---|
| The prepolymer of Example 1 | 100 |
| Benzol | 30 |
| Tricresyl phosphate | 15 |
| "Halowax 4004" | 30 |
| Antimony trioxide | 10 |
| "Bentone 27" | 10 |
| Stannous octoate | 9 |
| Silica sand (80 mesh) | 50 |

TYPICAL EXAMPLE 9

| Constituents: | Parts by weight |
|---|---|
| The prepolymer of Example 1 | 100 |
| Xylene | 24 |
| Mineral Oil | 20 |
| "Halowax 4004" | 36 |
| Antimony Trioxide | 13 |
| "Cab-O-Sil" | 13 |
| Stannous octoate | 20 |
| Silica sand (80 mesh) | 400 |

While I have used in my examples, the prepolymer formed by the reaction of 1,4-butanediol diglycidyl ether, it is to be understood that I may use, instead of that ether, other diglycidyl ethers of polyhydric alcohols as explained earlier hereinabove.

Examples 3 to 9 are all particularly useful as vibration damping compositions, and depending upon formulation may be used or applied for this purpose as follows:

(a) Cast into tiles or other forms and subsequently caused to adhere by an interposed adhesive to an object or wall whose vibrations are to be damped, (b) Cast directly against or upon an object or wall whose vibrations are to be damped, (c) Sprayed upon or against a wall or object whose vibrations are to be damped.

The prepolymer of Example 1, when stannous octoate is added thereto, may be used as the adhesive for confining castings of the cured resin and their materials to a wall or object.

For spray, brush or other applications, the following are examples of some solvents, thinners, and diluents that may be used in accordance with this invention: methyl acetate, acetone, ethyl acetate, methyl ethyl ketone, benzene, isopropyl acetate, methanol, ethyl propionate, isopropyl alcohol, ethyl alcohol, diethyl ketone, toluol, sec-butyl acetate, isobutyl acetate, isobutyl methyl ketone, amyl acetate, Xylol, methyl Cellosolve, Cellosolve, butyl Cellosolve, isopropyl Cellosolve, Cellosolve acetate, butyl Cellosolve acetate, butyl Cellosolve phthalate, butyl Cellosolve stearate, Cellosolve phthalate, butyl formate, butyl sebacate, ethylene glycol monomethyl ether, methyl amyl acetate, ethylene glycol monobutyl ether, ethyl ether and isopropyl ether.

To prepare the composition for spray, brush and other modes of applications, suitable gellants, anti-sag and thixotropic agents are added to the compositions, and some examples of such additives are: "Bentone" gellants such as "Bentone 27," "Bentone 34" and "Bentone 38" which are described in a technical bulletin "Bentone gellants," A Handbook of Practical Application, published in 1960 by the National Lead Co. "Bentone 34" a finely divided, light cream-colored powder which has the property of swelling in liquid organic systems. Chemically, it is dimethyldioctadecyl ammonium bentonite. Sp. gr. 1.80; bulking value, 15.0 lbs./gal.; fineness, less than 5% on 200 mesh-screen; water content, less than 3.0%. "Bentone 38," an organic derivative of a special magnesium montmorillonite that is used for thickening and gelling organic liquids. It produces thixotropic gels with high efficiency and very light color. Supplied as a fine, creamy-white powder; sp. gr. 1.80; bulking value, 15.0 lbs./gal. Another example is "Cab-O-Sil" which is identified in a bulletin C Gen-1 dated January 1960 by the Cabot Corporation, as being a pyrogenic colloidal silica prepared in a hot gaseous environment by a vapor-phase hydrolysis of a silicon compound instead of by the usual aqueous precipitation process. Its outstanding properties are low water content, enormous external surface area, and high degree of particle separation and is an inert material for use in modifying the flow characteristics of aqueous and non-aqueous media.

Any suitable filler or fillers may be added to the composition, including iron oxide lead oxide, aluminum oxide, siliceous chalk, carbon black, calcium carbonate, silica sand, silica flour, ground mica, calcium silicate, granulated cork, graphite, limestone, marble chips, marble flour, metal particles and powders, silicone carbide, asbestos dust, wood flour, and vermiculite. The particles of the fillers can vary considerably but usually are of sizes to pass through 4 to 300 mesh screens. Other additives or fillers that may be used are glass microspheres, resinous microballoons, metallic microballoons, resinous hollow spheres and hollow metallic spheres. These microballoons, microspheres and spheres not only act as fillers but also add buoyancy to the composition when a body of the composition containing these microballoons, microspheres, sphere or bodies is immersed in a liquid. The amount of the filler to be used is governed by (a) the particle size of the filler, (b) the density of the filler, and (c) the bulking value of the filler.

For use in spray, brush and other manners of applying the composition to a wall or object, some examples of suitable additive agents, such as slip additives, flow improves, and internal lubricants, are dioctyl phthalate, triphenyl phosphate, tricresyl phosphate, diethyl phthalate, tris-B-chloroethyl phosphate, dibutyl sebacate, mineral oils, dioctyl sebacate, mineral spirits, solvent naphtha, dibutyl phthalate, toluene, xylene, heptane, hexane, Solvesso No. 1, turpentine, ethylene glycol, glycol, and glycerol. The additives may be used individually or in combination of any of them. These additives may be also, for convenience, referred to as "slip additives" and they act like internal lubricants in facilitating sprayability of compositions that are made in accordance with this invention. The expressions "internal lubricant" or "internal lubrication" are used as a synonym for a plasticizer, since a plasticizer acts as such by virtue of its solvent action, in dispersing the polymer chains and by virtue of its lubrication in lowering the frictional forces between resinous polymers and/or resinous compositions and metal surfaces.

As a very general rule, no one formulation in accordance with this invention, will provide a cure composition in accordance with this invention having the necessary characteristics for all types of service, nor yield optimum values for all properties. The service requirements of the final article and/or composition determine the particular type of formulation which should be used with the basic new composition of this invention. Hence the formulator should select the additives for use with the basic new compositions of this invention that are best suited to his particular needs.

Because of variations in the batch properties of the various chemical components, compounds or materials, which are obtained commercially and used in the practice of this invention, all of the values, proportions of components, examples, statements, conditions, ratios and physical properties which have been given hereinabove, should be considered as typical, representative and illustrate and not necessarily optimum.

Changes in production techniques for the chemical compounds, chemical components, and materials used or involved with this invention, over a period of time, may or will have considerable or cumulative effect on the final product, or end item or system, and hence periodic re-evaluation may be advisable or desirable.

Hence the products, and end items or systems according to this invention may or will vary somewhat in property characteristics, due to variations in the properties of various batches of commercially available chemical components, compounds or materials used, over which this inventor has no control. Therefore, any specific characterizing properties of the new product, end items, or systems which may be given in this specification and its claims, are actually those obtained in illustrative, representative or typical examples, and may not correspond to results obtained by others when using different commercially obtained materials.

The curing of the basic prepolymer in accordance with this invention as obtained with the addition of stannous octoate, occurs normally without added heat, such as from about 50° F. to 100° F., which includes room temperature. Room temperature is defined in ASTM standards on plastics, 12th Edition of March 1961, as a temperature in the range of 68° F. to 86° F. and is usually applied to a temperature in this range without reference to relative humidity.

It will be understood that various changes in the details, steps, materials, temperatures and procedures which have been herein described in order to explain the nature of the invention, may be made by those skilled in the art within the principle and scope of the invention as expressed in the appended claims.

I claim:
1. The method of preparing a resinous composition which comprises:
   (a) preparing a prepolymer by chemically combining a diglycidyl ether of a polyhydric alcohol with 4,4'-methylene-bis(2-chloroaniline), cooling said prepolymer and
   (b) adding stannous octoate as a curing agent to said prepolymer and curing at room temperature.

2. The method according to claim 1, wherein the components of the prepolymer as mixed are stirred until the mixture becomes a homogeneous liquid before the stannous octoate is added.

3. The method according to claim 1, wherein the proportions of the components of the prepolymer are 100 parts by weight of the ether with about 27 to 85 parts of 4,4'-methylene-bis(2-chloroaniline).

4. The method according to claim 1, wherein about 4 to 85 parts by weight of stannous octoate are used with 100 parts by weight of the prepolymer.

5. The method according to claim 1, wherein the proportions of the components of the prepolymer are 100 parts by weight of the ether with about 27 to 85 parts of 4,4'-methylene-bis(2-chloroaniline), and about 4 to 85 parts by weight of stannous octoate are used with 100 parts by weight of the prepolymer.

6. The method according to claim 1, wherein the components of the prepolymer are stirred while at a temperature between about 212° F. and 225° F. until a homogeneous liquid is obtained before the stannous octoate is added.

References Cited

UNITED STATES PATENTS

| | | | |
|---|---|---|---|
| 2,773,048 | 12/1956 | Formo et al. | 260—47 |
| 2,801,229 | 7/1957 | Deffoff et al. | 260—47 |
| 2,989,498 | 6/1961 | Mackenzie et al. | 260—47 |
| 3,158,586 | 11/1964 | Krauser | 260—830 |
| 3,201,360 | 8/1965 | Proops et al. | 260—47 |
| 3,349,060 | 10/1967 | Lewis et al. | 260—47 X |

FOREIGN PATENTS 791,836   3/1958   Great Britain.

HOSEA E. TAYLOR, JR., *Primary Examiner.*

C. W. IVY, *Assistant Examiner.*

U.S. Cl. X.R.

117—104; 260—2, 21, 31.8, 33.6, 33.8, 37